United States Patent
Tsai et al.

(10) Patent No.: US 10,615,645 B2
(45) Date of Patent: Apr. 7, 2020

(54) POWER SUPPLY DEVICE OF INDUCTION TYPE POWER SUPPLY SYSTEM AND NFC DEVICE IDENTIFICATION METHOD OF THE SAME

(71) Applicant: Fu Da Tong Technology Co., Ltd, New Taipei (TW)

(72) Inventors: Ming-Chiu Tsai, New Taipei (TW); Chi-Che Chan, New Taipei (TW)

(73) Assignee: Fu Da Tong Technology Co., Ltd, New Taipei (TW)

( * ) Notice: Subject to any disclaimer, the term of this patent is extended or adjusted under 35 U.S.C. 154(b) by 46 days.

(21) Appl. No.: 16/124,211

(22) Filed: Sep. 7, 2018

(65) Prior Publication Data
US 2019/0020222 A1    Jan. 17, 2019

Related U.S. Application Data

(63) Continuation-in-part of application No. 15/231,795, filed on Aug. 9, 2016, now Pat. No. 10,289,142,
(Continued)

(30) Foreign Application Priority Data

Jun. 26, 2018 (TW) .............................. 107121945 A

(51) Int. Cl.
*G05B 9/02* (2006.01)
*H02J 50/12* (2016.01)
(Continued)

(52) U.S. Cl.
CPC ................ *H02J 50/12* (2016.02); *G05B 9/02* (2013.01); *G05F 1/66* (2013.01); *H02J 50/80* (2016.02); *H04B 5/0075* (2013.01)

(58) Field of Classification Search
CPC .... G05B 9/02; G05F 1/66; H02J 50/12; H02J 50/80; H04B 5/0075
See application file for complete search history.

(56) References Cited

U.S. PATENT DOCUMENTS 4,393,516 A    7/1983 Itani
5,270,998 A    12/1993 Uchiumi
(Continued)

FOREIGN PATENT DOCUMENTS

CN    1142649 A    2/1997
CN    1476535 A    2/2004
(Continued)

OTHER PUBLICATIONS

Yang, "A multi-coil wireless charging system with parasitic mental detection", Donghua University Master Dissertation, China Master's Theses Full-Text Database, Engineering Technology II, vol. 09, May 2014.

*Primary Examiner* — Abdelmoniem I Elamin
(74) *Attorney, Agent, or Firm* — CKC & Partners Co., LLC

(57) ABSTRACT

A power supply device used in an induction type power supply system is provided that includes a power supply coil, a auxiliary coil, a power supply driving module, a detection driving module, a signal detection module and a processing module. The power supply driving module drives the power supply coil to transmit a power signal. When the power supply driving module is under a non-working status, the detection driving module drives the auxiliary coil to transmit a detection signal and drives the auxiliary coil to transmit a data request signal. After transmitting the data request signal, the signal detection module detects a reflection signal corresponding to the data request signal on the auxiliary coil. The processing module keeps the power supply driving module under the non-working status when the reflection (Continued)

signal having a data characteristic is determined to be detected by the signal detection module.

20 Claims, 4 Drawing Sheets

Related U.S. Application Data which is a continuation-in-part of application No. 15/005,014, filed on Jan. 25, 2016, now Pat. No. 10,114,396, and a continuation-in-part of application No. 15/197,796, filed on Jun. 30, 2016, now Pat. No. 10,312,748, which is a continuation-in-part of application No. 14/822,875, filed on Aug. 10, 2015, now Pat. No. 9,960,639, and a continuation-in-part of application No. 14/731,421, filed on Jun. 5, 2015, now Pat. No. 10,038,338, and a continuation-in-part of application No. 14/876,788, filed on Oct. 6, 2015, now Pat. No. 9,831,687, said application No. 14/731,421 is a continuation-in-part of application No. 14/017,321, filed on Sep. 4, 2013, now Pat. No. 9,628,147, and a continuation-in-part of application No. 13/541,090, filed on Jul. 3, 2012, now Pat. No. 9,075,587, application No. 14/017,321, filed on Sep. 4, 2013, which is a continuation-in-part of application No. 13/541,090, filed on Jul. 3, 2012, now Pat. No. 9,075,587, and a continuation-in-part of application No. 13/212,564, filed on Aug. 18, 2011, now Pat. No. 8,941,267, which is a continuation-in-part of application No. 13/154,965, filed on Jun. 7, 2011, now Pat. No. 8,810,072, said application No. 14/876,788 is a continuation-in-part of application No. 14/017,321, filed on Sep. 4, 2013, now Pat. No. 9,628,147, application No. 16/124,211, which is a continuation-in-part of application No. 16/028,397, filed on Jul. 5, 2018, which is a continuation-in-part of application No. 14/535,338, filed on Nov. 7, 2014, now Pat. No. 10,056,944, which is a continuation-in-part of application No. 14/251,655, filed on Apr. 14, 2014, now Pat. No. 9,671,444, and a continuation-in-part of application No. 14/017,321, filed on Sep. 4, 2013, now Pat. No. 9,628,147, and a continuation-in-part of application No. 13/900,544, filed on May 23, 2013, now Pat. No. 9,600,021, said application No. 14/251,655 is a continuation-in-part of application No. 14/017,321, filed on Sep. 4, 2013, now Pat. No. 9,628,147, which is a continuation-in-part of application No. 13/212,564, filed on Aug. 18, 2011, now Pat. No. 8,941,267, and a continuation-in-part of application No. 13/541,090, filed on Jul. 3, 2012, now Pat. No. 9,075,587, said application No. 13/212,564 is a continuation-in-part of application No. 13/154,965, filed on Jun. 7, 2011, now Pat. No. 8,810,072, said application No. 13/900,544 is a continuation-in-part of application No. 13/488,724, filed on Jun. 5, 2012, now Pat. No. 9,048,881, which is a continuation-in-part of application No. 13/154,965, filed on Jun. 7, 2011, now Pat. No. 8,810,072.

(51) Int. Cl.
*H02J 50/80* (2016.01)
*H04B 5/00* (2006.01)
*G05F 1/66* (2006.01)

(56) References Cited

U.S. PATENT DOCUMENTS

| | | | |
|---|---|---|---|
| 7,310,245 B2* | 12/2007 | Ohbo | H02M 3/3376 363/17 |
| 7,587,007 B2* | 9/2009 | Alamouti | H04B 7/0613 375/259 |
| 7,720,452 B2 | 5/2010 | Miyahara | |
| 7,939,963 B2 | 5/2011 | Chang | |
| 8,072,310 B1 | 12/2011 | Everhart | |
| 8,422,420 B1 | 4/2013 | Gulasekaran | |
| 8,731,116 B2 | 5/2014 | Norconk | |
| 9,048,881 B2 | 6/2015 | Tsai | |
| 9,075,587 B2 | 7/2015 | Tsai | |
| 9,331,496 B2* | 5/2016 | Doi | H02J 50/12 |
| 9,424,446 B2* | 8/2016 | Baarman | G01F 23/20 |
| 9,559,553 B2* | 1/2017 | Bae | H02J 50/60 |
| 2003/0123168 A1 | 7/2003 | Yokomizo | |
| 2005/0076102 A1 | 4/2005 | Chen | |
| 2008/0030398 A1 | 2/2008 | Nakamura | |
| 2009/0026844 A1 | 1/2009 | Iisaka | |
| 2009/0271048 A1 | 10/2009 | Wakamatsu | |
| 2009/0284082 A1 | 11/2009 | Mohammadian | |
| 2009/0302800 A1 | 12/2009 | Shiozaki | |
| 2010/0237943 A1 | 9/2010 | Kim | |
| 2010/0270867 A1 | 10/2010 | Abe | |
| 2010/0277003 A1* | 11/2010 | Von Novak | H02J 50/70 307/104 |
| 2011/0196544 A1 | 8/2011 | Baarman | |
| 2012/0068552 A1* | 3/2012 | Nishino | H01F 38/14 307/104 |
| 2012/0139356 A1* | 6/2012 | Jung | H01F 38/14 307/104 |
| 2012/0153739 A1 | 6/2012 | Cooper | |
| 2012/0272076 A1 | 10/2012 | Tsai | |
| 2012/0293009 A1 | 11/2012 | Kim | |
| 2013/0002037 A1* | 1/2013 | Doi | H02J 50/12 307/104 |
| 2013/0049484 A1 | 2/2013 | Weissentern | |
| 2013/0162054 A1 | 6/2013 | Komiyama | |
| 2013/0162204 A1 | 6/2013 | Jung | |
| 2013/0175873 A1 | 7/2013 | Kwon | |
| 2013/0175937 A1 | 7/2013 | Nakajo | |
| 2013/0176023 A1 | 7/2013 | Komiyama | |
| 2013/0267213 A1 | 10/2013 | Hsu | |
| 2013/0342027 A1 | 12/2013 | Tsai | |
| 2014/0024919 A1 | 1/2014 | Metzenthen | |
| 2014/0077616 A1 | 3/2014 | Baarman | |
| 2014/0084857 A1 | 3/2014 | Liu | |
| 2014/0117760 A1* | 5/2014 | Baarman | H01F 38/14 307/38 |
| 2014/0152251 A1 | 6/2014 | Kim | |
| 2014/0184152 A1 | 7/2014 | Van Der Lee | |
| 2014/0355314 A1 | 12/2014 | Ryan | |
| 2015/0008756 A1 | 1/2015 | Lee | |
| 2015/0028875 A1 | 1/2015 | Irie | |
| 2015/0044966 A1 | 2/2015 | Shultz | |
| 2015/0054355 A1 | 2/2015 | Ben-Shalom | |
| 2015/0123602 A1 | 5/2015 | Patino | |
| 2015/0162054 A1 | 6/2015 | Ishizu | |
| 2015/0162785 A1 | 6/2015 | Lee | |
| 2015/0285926 A1 | 10/2015 | Oettinger | |
| 2016/0241086 A1 | 8/2016 | Jung | |
| 2016/0241087 A1* | 8/2016 | Bae | H02J 7/025 |
| 2019/0058358 A1* | 2/2019 | Bae | H02J 7/02 |
| 2019/0267845 A1* | 8/2019 | Maniktala | H02J 50/40 |

FOREIGN PATENT DOCUMENTS

| | | |
|---|---|---|
| CN | 1930790 A | 3/2007 |
| CN | 101106388 A | 1/2008 |
| CN | 101907730 A | 12/2010 |
| CN | 101978571 A | 2/2011 |
| CN | 102474133 A | 5/2012 |
| CN | 102804619 A | 11/2012 |
| CN | 103069689 A | 4/2013 |
| CN | 103248130 A | 8/2013 |

(56) References Cited

FOREIGN PATENT DOCUMENTS

| | | |
|---|---|---|
| CN | 103425169 A | 12/2013 |
| CN | 103457361 A | 12/2013 |
| CN | 103852665 A | 6/2014 |
| CN | 103975497 A | 8/2014 |
| CN | 104521151 A | 4/2015 |
| CN | 104685760 A | 6/2015 |
| CN | 104734370 A | 6/2015 |
| CN | 105049008 A | 11/2015 |
| CN | 105449875 A | 3/2016 |
| CN | 205105005 U | 3/2016 |
| EP | 2608419 A2 | 6/2013 |
| EP | 2793355 A1 | 10/2014 |
| JP | 2008206305 A | 9/2008 |
| JP | 2010213414 A | 9/2010 |
| JP | 2013135518 A | 7/2013 |
| JP | 2014171371 A | 9/2014 |
| JP | 2017511117 A | 4/2017 |
| KR | 100650628 B1 | 11/2006 |
| TW | 201034334 A1 | 9/2010 |
| TW | I389416 B | 3/2013 |
| TW | I408861 B | 9/2013 |
| TW | 201414130 A | 4/2014 |
| TW | 201415752 A | 4/2014 |
| TW | 201440368 A | 10/2014 |
| TW | I459676 B | 11/2014 |
| TW | I472897 B | 2/2015 |
| TW | I483509 B | 5/2015 |
| WO | 2013043974 A2 | 3/2013 |
| WO | 2015154086 A1 | 10/2015 |

\* cited by examiner

POWER SUPPLY DEVICE OF INDUCTION TYPE POWER SUPPLY SYSTEM AND NFC DEVICE IDENTIFICATION METHOD OF THE SAME

RELATED APPLICATIONS

This application claims priority to Taiwan Application Serial Number 107121945, filed Jun. 26, 2018, and is a continuation-in-part application of U.S. application Ser. No. 15/231,795 filed Aug. 9, 2016, now U.S. Pat. No. 10,289,142, which is a continuation-in-part application of U.S. application Ser. No. 15/005,014, filed on Jan. 25, 2016, now U.S. Pat. No. 10,114,396, and a continuation-in-part application of U.S. application Ser. No. 15/197,796, filed on Jun. 30, 2016, now U.S. Pat. No. 10,312,748, which is further a continuation-in-part application of U.S. application Ser. No. 14/822,875, filed on Aug. 10, 2015, now U.S. Pat. No. 9,960,639, a continuation-in-part application of U.S. application Ser. No. 14/731,421, filed on Jun. 5, 2015, now U.S. Pat. No. 10,038,338, and a continuation-in-part application of U.S. application Ser. No. 14/876,788, filed on Oct. 6, 2015, now U.S. Pat. No. 9,831,687, the contents of which are incorporated herein by reference.

U.S. application Ser. No. 14/731,421 is further a continuation-in-part application of U.S. application Ser. No. 14/017,321, filed on Sep. 4, 2013, now U.S. Pat. No. 9,628,147, and a continuation-in-part application of U.S. application Ser. No. 13/541,090, filed on Jul. 3, 2012, now U.S. Pat. No. 9,075,587. U.S. application Ser. No. 14/017,321 is further a continuation-in-part application of U.S. application Ser. No. 13/541,090, filed on Jul. 3, 2012, now U.S. Pat. No. 9,075,587, and a continuation-in-part application of U.S. application Ser. No. 13/212,564, filed on Aug. 18, 2011, now U.S. Pat. No. 8,941,267, which is further a continuation-in-part application of U.S. application Ser. No. 13/154,965, filed on Jun. 7, 2011, now U.S. Pat. No. 8,810,072. U.S. application Ser. No. 14/876,788 is further a continuation-in-part application of application Ser. No. 14/017,321, filed on Sep. 4, 2013, now U.S. Pat. No. 9,628,147.

This application claims is also a continuation-in-part application of U.S. application Ser. No. 16/028,397 filed Jul. 5, 2018, still pending, which is a continuation-in-part application of U.S. application Ser. No. 14/535,338, filed on Nov. 7, 2014, now U.S. Pat. No. 10,056,944, wherein U.S. application Ser. No. 14/535,338 is further a continuation-in-part application of U.S. application Ser. No. 14/251,655, filed on Apr. 14, 2014, now U.S. Pat. No. 9,671,444, a continuation-in-part application of U.S. application Ser. No. 14/017,321, filed on Sep. 4, 2013, now U.S. Pat. No. 9,628,147 and a continuation-in-part application of U.S. application Ser. No. 13/900,544, filed on May 23, 2013, now U.S. Pat. No. 9,600,021, wherein U.S. application Ser. No. 14/251,655 is further a continuation-in-part application of U.S. application Ser. No. 14/017,321, now U.S. Pat. No. 9,628,147, and U.S. application Ser. No. 14/017,321 is further a continuation-in-part application of U.S. application Ser. No. 13/212,564, filed on Aug. 18, 2011, now U.S. Pat. No. 8,941,267 and a continuation-in-part application of U.S. application Ser. No. 13/541,090, filed on Jul. 3, 2012, now U.S. Pat. No. 9,075,587, wherein U.S. application Ser. No. 13/212,564 is further a continuation-in-part application of U.S. application Ser. No. 13/154,965, filed on Jun. 7, 2011 now U.S. Pat. No. 8,810,072. U.S. application Ser. No. 13/900,544 is further a continuation-in-part application of U.S. application Ser. No. 13/488,724 filed on Jun. 5, 2012, now U.S. Pat. No. 9,048,881, which is further a continuation-in-part application of U.S. application Ser. No. 13/154,965, now U.S. Pat. No. 8,810,072. The contents of these applications are incorporated herein by reference.

BACKGROUND

Field of Invention

The present invention relates to an induction type power supply technology. More particularly, the present invention relates to a power supply device of an induction type power supply system and a NFC device identification method of the same.

Description of Related Art

In an induction type power supply system, a power supply device is used to drive the power supply coil by using a drive circuit such that the power supply coil is resonant to deliver electromagnetic energy. The coil of the power receiving device further receives the electromagnetic energy generated by the resonant power supply coil to convert the energy to a direct current. The transmission of the power is thus completed.

In daily life, smart cards can use near field communication (NFC) technology to perform communication. However, most of the smart cards can be driven by receiving a small amount of electromagnetic energy. When the smart card receives too much amount of the electromagnetic energy, the chip therein can be damaged. If the user accidentally puts the smart card on the power supply coil of the power supply device of the induction type power supply system and the detection mechanism is absent in the power supply device, the chip of the smart card may be damaged during the transmission of the power signal.

Accordingly, what is needed is an integrated circuit and an operation method of the same to address the issues mentioned above.

SUMMARY

The invention provides a power supply device used in an induction type power supply system that includes a power supply coil, a auxiliary coil, a power supply driving module, a detection driving module, a signal detection module and a processing module. The power supply driving module is electrically coupled to the power supply coil and is configured to drive the power supply coil to transmit a power signal. The auxiliary driving module is electrically coupled to the auxiliary coil and is configured to drive the auxiliary coil to transmit a detection signal during a first time interval and drive the auxiliary coil to transmit a data request signal during a second time interval after the first time interval when the power supply driving module is under a non-working status. The signal detection module is electrically coupled to the auxiliary coil and is configured to detect a reflection signal corresponding to the data request signal on the auxiliary coil during a third time interval after the second time interval that the data request signal is transmitted. The processing module is configured to determine whether the signal detection module detects the reflection signal having a data characteristic and further keep the power supply driving module under the non-working status when the reflection signal having the data characteristic is determined to be detected by the signal detection module.

Another aspect of the present invention is to provide a near field communication (NFC) device identifying method used in a power supply device in an induction type power supply system that includes the steps outlined below. An auxiliary coil is driven to transmit a detection signal during a first time interval and the auxiliary coil is driven to transmit a data request signal during a second time interval after the second time interval when a power supply driving module is under a non-working status by an auxiliary driving module electrically coupled to the auxiliary coil. A reflection signal corresponding to the data request signal on the auxiliary coil is detected during a third time interval after the second time interval that the data request signal is transmitted by a signal detection module. Whether the signal detection module detects the reflection signal having a data characteristic is determined by a processing module. The power supply driving module is kept under the non-working status by the processing module when the reflection signal having the data characteristic is determined to be detected by the signal detection module.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
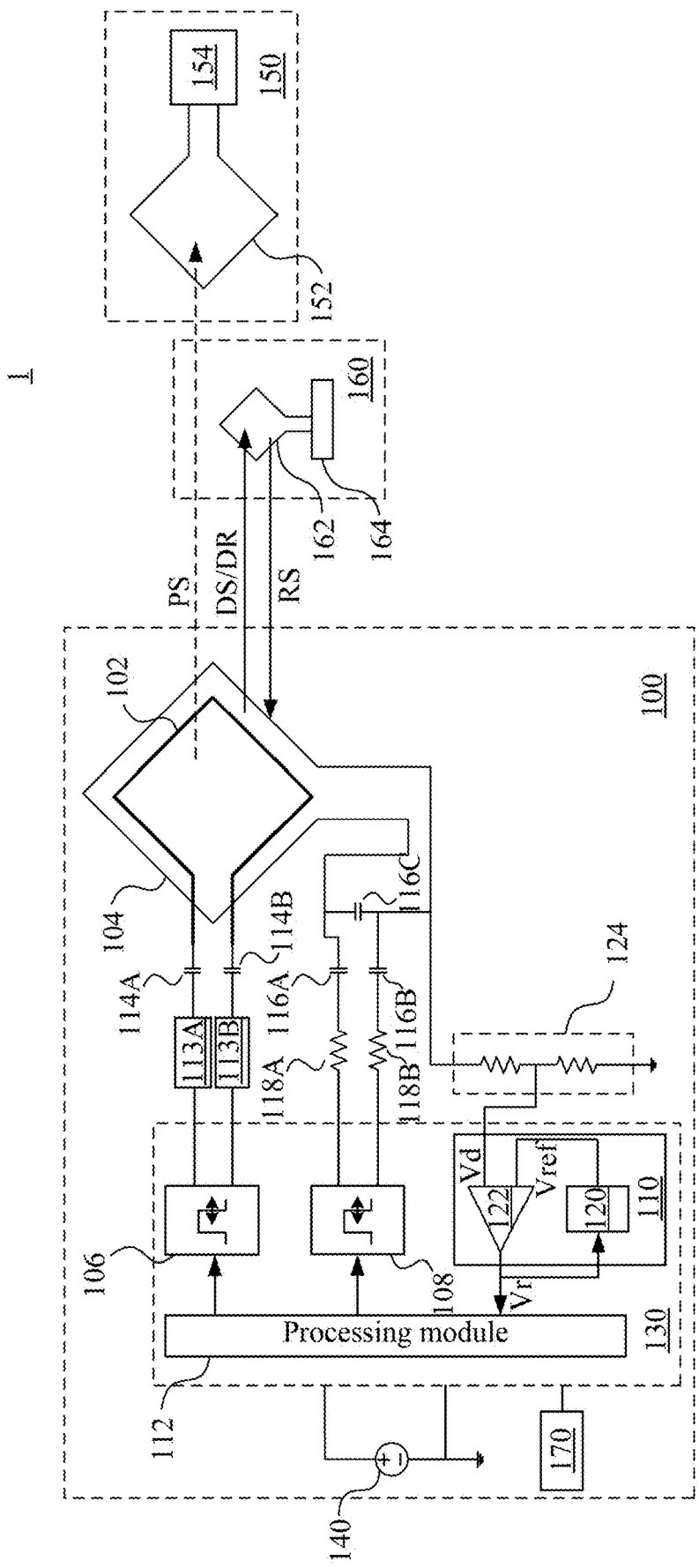
FIG. 1 is a block diagram of an induction type power supply system in an embodiment of the present invention.

Reference is now made to FIG. 1. FIG. 1 is a block diagram of an induction type power supply system 1 in an embodiment of the present invention. The induction type power supply system 1 includes a power supply device 100 and a power receiving device 150. The power supply device 100 is configured to generate a power signal PS and transmit the power signal PS to the power receiving device 150 in a wireless way to supply power to the power receiving device 150.

The power supply device 100 includes a power supply coil 102, an auxiliary coil 104, a power supply driving module 106, an auxiliary driving module 108, a signal detection module 110 and a processing module 112.

In an embodiment, the power supply driving module 106, the auxiliary driving module 108, the signal detection module 110 and the processing module 112 can be integrated in a single microcontroller 130. The microcontroller 130 can be electrically coupled to a power supply 140 to receive power therefrom such that the modules of the microcontroller 130 operation accordingly. However, the present invention is not limited thereto.

The power supply driving module 106 is electrically coupled to the power supply coil 102 and is configured to drive the power supply coil 102 to transmit the power signal PS. In an embodiment, the power supply driving module 106 is a pulse width modulator (PWM) and is configured to output signals having different oscillating frequencies under the control of the processing module 112 to drive the power supply coil 102.

In an embodiment, the power supply device 100 further includes power supply resonant capacitors 114A and 1146 and power switch elements 113A and 113B each electrically coupled between one of the two terminals of the power supply coil 102 and the power supply driving module 106.

When the power supply driving module 106 is under a working status, the power signal PS is transmitted to the power receiving device 150 by using the method described above. In an embodiment, the power receiving device 150 includes a power receiving coil 152 and a load module 154. The power receiving coil 152 is configured to receive the power signal PS and converts the power signal PS by using the load module 154.

When the power supply driving module 106 is under a non-working status, the power supply driving module 106 stops to drive the power supply coil 102 to further stop to transmit the power signal PS to the power receiving device 150.

The auxiliary driving module 108 is electrically coupled to the auxiliary coil 104 and is configured to drive the auxiliary coil 104 to transmit a detection signal DS during a first time interval when the power supply driving module 106 is under the non-working status and further transmit a data request signal DR during a second time interval after the first time interval. In an embodiment, the auxiliary driving module 108 is a pulse width modulator and is configured to output signals having different oscillating frequencies under the control of the processing module 112 to drive the auxiliary coil 104.

In an embodiment, the power supply device 100 further includes power supply resonant capacitors 116A-116C. Each of the power supply resonant capacitors 116A and 116B is electrically coupled between one of the two terminals of the auxiliary coil 104 and the auxiliary driving module 108. The power supply resonant capacitor 116C is electrically coupled between the power supply resonant capacitors 116A and 116B. The power supply resonant capacitors 116A-116C are configured to resonate with the auxiliary coil 104 when the auxiliary driving module 108 drives the auxiliary coil 104.

In an embodiment, the power supply device 100 may selectively include a resistor 118A and a resistor 118B each electrically coupled to the power supply resonant capacitor 116A and the power supply resonant capacitor 116B is series between one of the two terminals of the auxiliary coil 104 and the auxiliary driving module 108 and each configured to limit the driving current at the port of the auxiliary driving module 108 to provide a protection mechanism.

In an embodiment, the power supply driving module 106 drives the power supply coil 102 to generate the power signal PS that operates at around 100 KHz. The auxiliary driving module 108 drives the auxiliary coil 104 to generate the detection signal DS and the data request signal DR that operate at around 13.56 MHz or 6.78 MHz. As a result, the operation frequency of the auxiliary coil 104 is higher than the operation frequency of the power supply coil.

The signal detection module 110 is configured to detect a reflection signal RS corresponding to the data request signal DR on the auxiliary coil 104 during a third time interval after the second time interval. The auxiliary coil 104 overlaps the power supply coil 102 in order to perform detection on the power supplying range of the power supply coil 102. In an embodiment, the signal detection module 110 includes a digital to analog converter 120 and a comparator 122.

The digital to analog converter 120 is configured to generate a reference voltage Vref. The comparator 122 is electrically coupled to the digital to analog converter 120 and the auxiliary coil 104 and is configured to receive the reference voltage Vref and a detected voltage Vd related to the auxiliary coil 104 to detect the reflection signal RS according to the comparison result Vr of the reference voltage Vref and the detected voltage Vd.

In an embodiment, the power supply device 100 may selectively include a voltage-dividing module 124 that is electrically coupled between the auxiliary coil 104 and the comparator 122. The detected voltage Vd received by the comparator 122 is a divided voltage of the voltage on the auxiliary coil 10. It is appreciated that if the components in the signal detection module 110 have higher endurance against the voltage, the voltage of the auxiliary coil 104 can be directly received to perform comparison with the reference voltage Vref without using the voltage-dividing module 124.

The processing module 112 determines whether the signal detection module 110 detects the reflection signal RS having the data characteristic to further determine whether a smart card, such as but not limited to the smart card 160 illustrated in FIG. 1, exists within the power supplying range of the power supply coil 102. It is appreciated that though the smart card 160 is illustrated together with the other components of the induction type power supply system 1 in FIG. 1, the smart card 160 is actually not a part of the induction type power supply system 1.

In an embodiment, the smart card 160 can be such as, but not limited to a module that performs communication by using NFC technology. In an embodiment, the smart card 160 may include a coil 162 and a chip module 164. When the auxiliary driving module 108 drives the auxiliary coil 104 to transmit the detection signal DS and the detection signal DS is received by the coil 162 of the smart card 160, a small amount of power is provided to the smart card 160 to drive the chip module 164 in the smart card 160 such that after the smart card 160 further receives the data request signal DR through the coil 162, the chip module 164 can generate a modulated signal to the coil 162 according to the data request signal DR. The modulated signal is reflected through the coil 162 to the auxiliary coil 104 in the form of the reflection signal RS.

When the processing module 112 determines that the signal detection module 110 detects the reflection signal RS having the data characteristic, the processing module 112 keeps the power supply driving module 106 under the non-working status to avoid the damage on the smart card 160 caused due to the power supply signal PS generated when the power supply driving module 106 drives the power supply coil 102.

In an embodiment, power supply device 100 may selectively include an alert module 170. When the processing module 112 determines that the signal detection module 110 detects the reflection signal RS having the data characteristic, the processing module 112 controls the alert module to notify the user to remove the smart card 160 by using a light, a buzzer, an amplifier, a display screen or a combination thereof.

When the processing module 112 determines that the signal detection module 110 does not detect the reflection signal RS having the data characteristic, the processing module 112 keeps the power supply driving module 106 under the working status to drive the power supply coil 102 to generate the power signal PS to supply power to the power receiving device 150.

It is appreciated that in an embodiment, since the object of the processing module 112 is to provide a protection mechanism to prevent the damage on the smart card 160, the signal detection module 110 only needs to determine whether the reflection signal RS has the data characteristic without the need to decode the reflection signal RS.

Figure 2:
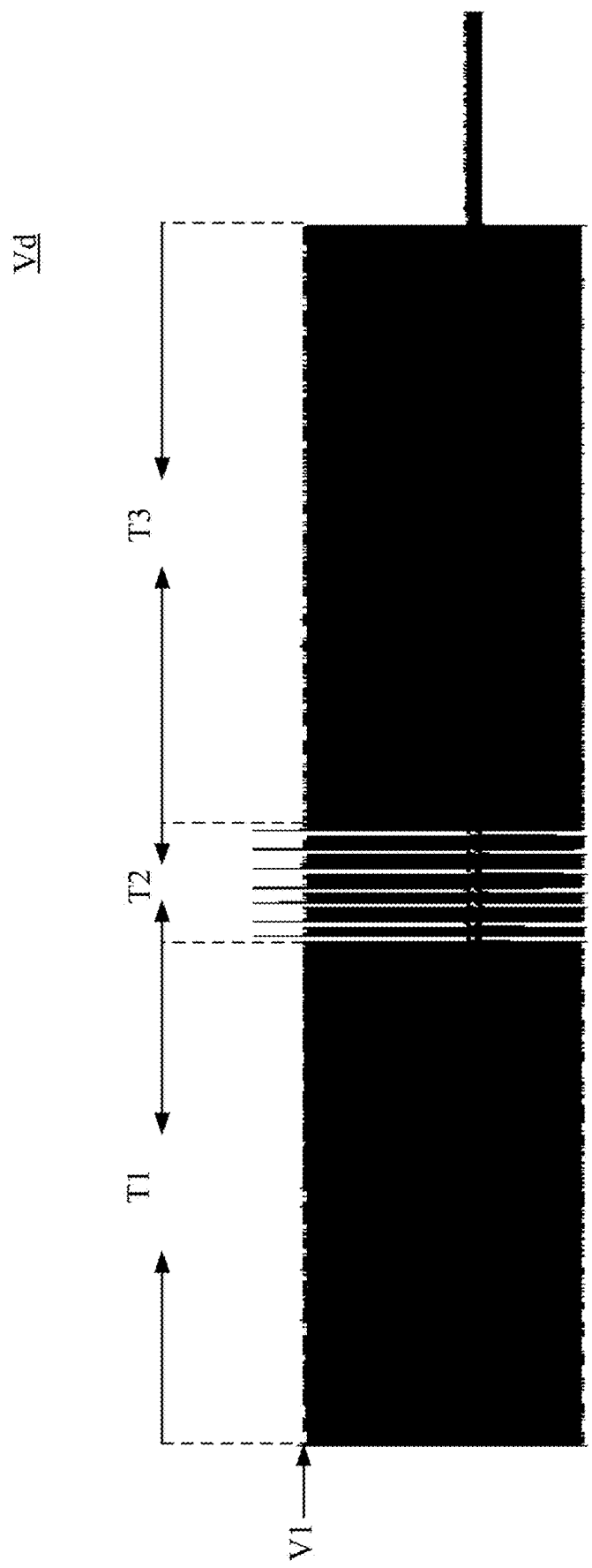
FIG. 2 is a diagram of the waveform of the detected voltage received by the comparator in an embodiment of the present invention.

Reference is now made to FIG. 2. FIG. 2 is a diagram of the waveform of the detected voltage Vd received by the comparator 122 in an embodiment of the present invention.

The detection mechanism of the signal detection module 110 is described in detail in accompany with FIG. 1 and FIG. 2.

As illustrated in FIG. 2, during the first time interval T1, the auxiliary driving module 108 drives the auxiliary coil 104 to transmit the detection signal DS such that the comparator 122 of the signal detection module 110 controls the digital to analog converter 120 to use the reference voltage Vref to track and lock a peak voltage V1 by using a feedback mechanism according to a comparison result of the detected voltage Vd and the reference voltage Vref.

At time interval T2, the auxiliary driving module 108 drives the auxiliary coil 104 to transmit the data request signal DR. In an embodiment, the auxiliary driving module 108 stops and starts to drive the auxiliary coil 104 in an interlaced manner for several times to generate the data request signal DR. The data request signal DR is also reflected on the detected voltage Vd received by the comparator 122.

When the smart card 160 exists, as described above, a small amount of power is received through the coil 162 to drive the chip module 164 in the smart card 160 such that the chip module 164 performs modulation on the coil 162 to reflect the modulated signal on the auxiliary coil 104 to form the reflection signal RS reflected on the detected voltage Vd.

More specifically, at the time interval T3, the reflection signal RS modulates the amplitude of the detected voltage Vd such that the detected voltage Vd has sections having the increased or decreased amplitude. As a result, at the time interval T3, the digital to analog converter 120 fine-tunes the reference voltage Vref by using a pitch value to slightly increase and decrease the reference voltage Vref such that the comparator 122 detects whether the reflection signal RS has the data characteristic according to a comparison result of the detected voltage Vd and the fine-tuned reference voltage Vref.

In an embodiment, the value of the increased reference voltage Vref is V2, the value of the decreased reference voltage Vref is V3.

In an embodiment, due to the different positions and distances of the smart card 160, the amplitude of the detected voltage Vd may be increased or decreased. As a result, the digital to analog converter 120 can increase and decrease the reference voltage Vref in a successive order or selectively dispose two signal detection modules 110 such that one of the two signal detection modules 110 increases the reference voltage Vref and the other one of the two signal detection modules 110 decreases the reference voltage Vref to accelerate the detection process.

Figure 3A:
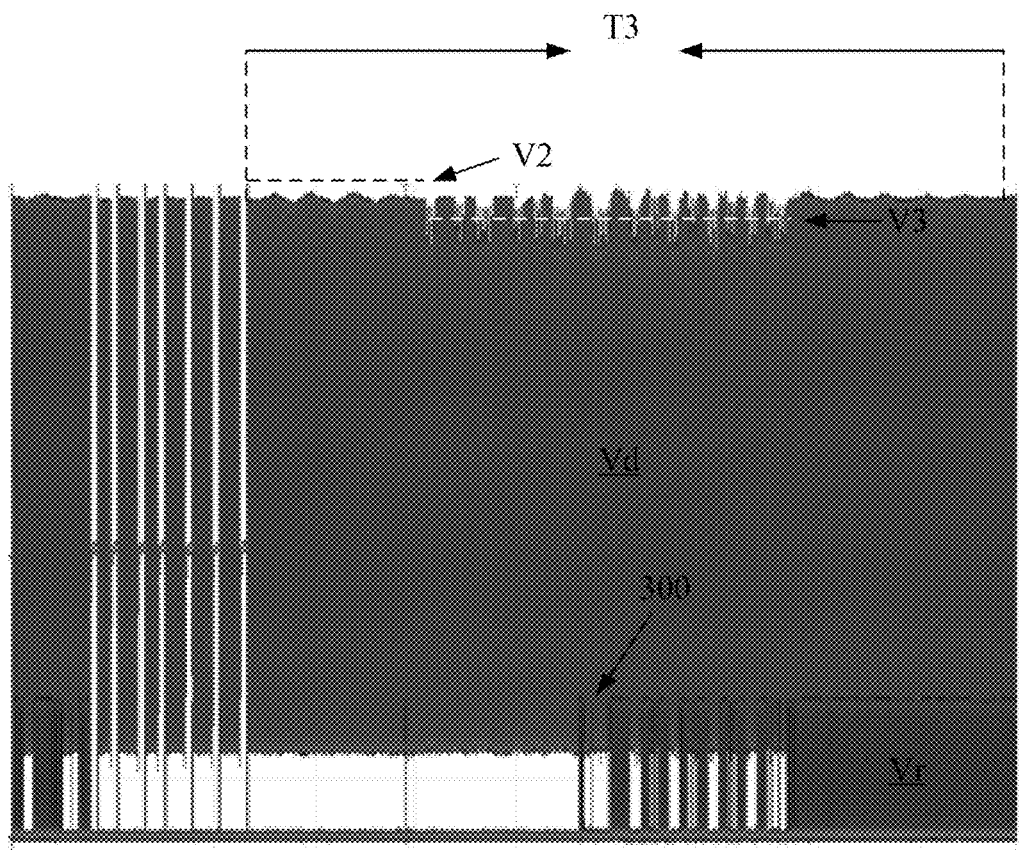
FIG. 3A is diagram of an enlarged waveform of the detected voltage and the comparison result at the time interval T3.

Reference is now made to FIG. 3. FIG. 3A is diagram of an enlarged waveform of the detected voltage Vd and the comparison result Vr at the time interval T3. The detected voltage Vd is illustrated in a lighter gray color and the comparison result Vr is illustrated in a darker gray color.

As illustrated in 3A, the digital to analog converter 120 increases the value of the reference voltage Vref to V2 at first. When the signal has an upward stretching part, a triggered section is present (i.e. the comparison result of the comparator 122 includes a part showing that the detected voltage is larger than the fine-tuned reference voltage Vref) that is determined to be the data characteristic. If no triggered section is presented (i.e. the comparison result of the comparator 122 does not include the part showing that the detected voltage is larger than the fine-tuned reference voltage Vref), the data characteristic is not presented either.

As a result, the data characteristic is not detected in the reflection signal RS during the section corresponding to the reference voltage Vref having the value V2 in FIG. 3A since the amplitude of the detected voltage Vd is completely smaller than V2.

Subsequently, the digital to analog converter 120 decreases the value of the reference voltage Vref to V3. When the signal has a downward stretching part, a non-triggered section is present (i.e. the comparison result of the comparator 122 includes a part showing that the detected voltage is smaller than the fine-tuned reference voltage Vref) that is determined to be the data characteristic. If no non-triggered section is presented (i.e. the comparison result of the comparator 122 does not include the part showing that the detected voltage is smaller than the fine-tuned reference voltage Vref), the data characteristic is not presented either.

As a result, the amplitude of a part of the detected voltage Vd is smaller than V3 during the section corresponding to the reference voltage Vref having the value V3 in FIG. 3A. As a result, a non-triggered section 300 is presented. The processing module 112 determines that the signal detection module 110 detects the reflection signal RS having the data characteristic based on the comparison result to further determine that the smart card 160 exists.

Figure 3B:
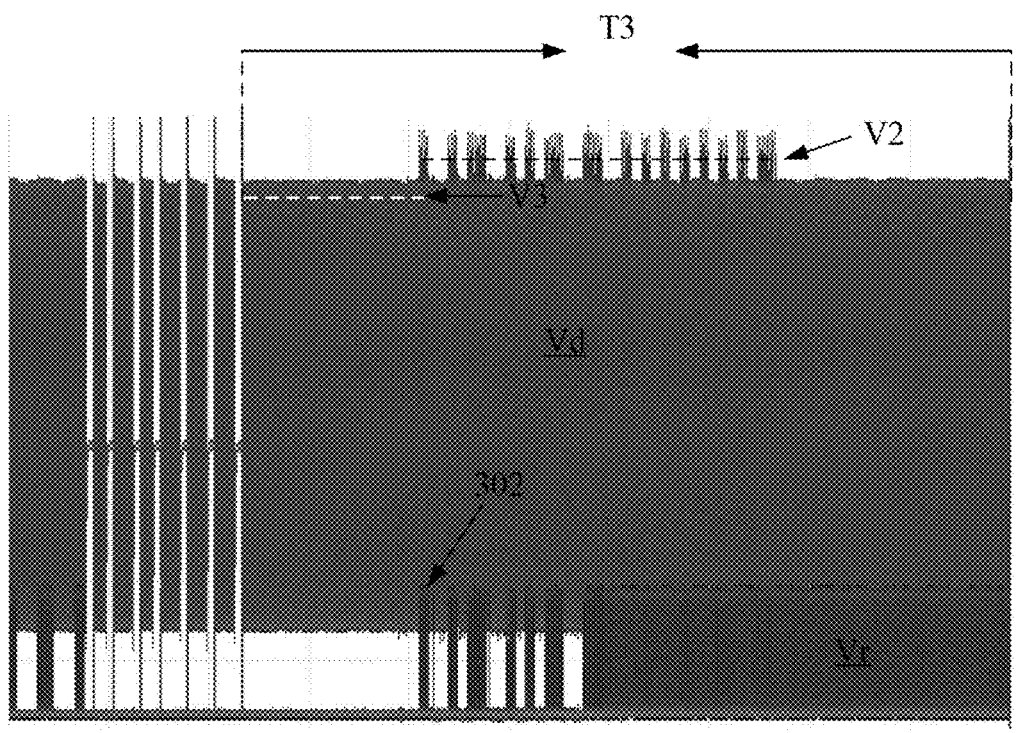
FIG. 3B is diagram of an enlarged waveform of the detected voltage and the comparison result at the time interval T3.

Reference is now made to FIG. 3B. FIG. 3B is diagram of an enlarged waveform of the detected voltage Vd and the comparison result Vr at the time interval T3. The detected voltage Vd is illustrated in a lighter gray color and the comparison result Vr is illustrated in a darker gray color.

As illustrated in 3B, the digital to analog converter 120 decreases the value of the reference voltage Vref to V3 at first. When the signal has a downward stretching part, a non-triggered section is present (i.e. the comparison result of the comparator 122 includes a part showing that the detected voltage is smaller than the fine-tuned reference voltage Vref) that is determined to be the data characteristic. If no non-triggered section is presented (i.e. the comparison result of the comparator 122 does not include the part showing that the detected voltage is smaller than the fine-tuned reference voltage Vref), the data characteristic is not presented either.

As a result, the data characteristic is not detected in the reflection signal RS during the section corresponding to the reference voltage Vref having the value V3 in FIG. 3B since the amplitude of the detected voltage Vd is completely larger than V3.

Subsequently, the digital to analog converter 120 increases the value of the reference voltage Vref to V2. When the signal has an upward stretching part, a triggered section is present (i.e. the comparison result of the comparator 122 includes a part showing that the detected voltage is larger than the fine-tuned reference voltage Vref) that is determined to be the data characteristic. If no triggered section is presented (i.e. the comparison result of the comparator 122 does not include the part showing that the detected voltage is larger than the fine-tuned reference voltage Vref), the data characteristic is not presented either.

As a result, the amplitude of a part of the detected voltage Vd is larger than V2 during the section corresponding to the reference voltage Vref having the value V2 in FIG. 3B. As a result, a non-triggered section 302 is presented. The processing module 112 determines that the signal detection module 110 detects the reflection signal RS having the data characteristic based on the comparison result to further determine that the smart card 160 exists.

The power supply device 100 of the present invention uses the auxiliary driving module 108 to transmit the high frequency detection signal DS and the data request signal DR through the auxiliary coil 104 and perform comparison between the detected voltage Vd and the fine-tuned reference voltage Vref that is increased or decreased slightly to determine whether the signal detection module 110 detects the reflection signal RS having the data characteristic. When the processing module 112 determines that the signal detection module 110 detects the reflection signal RS having the data characteristic, the processing module 112 further keeps the power supply driving module 106 under a non-working status to avoid the damage caused on the smart card 160 due to the low frequency power signal PS generated by the power supply coil 102.

Further, since the data request signal DR is generated by imitating the actual data request signal in the NFC technology and the presence of the decoding module for decoding the reflection signal RS is not necessary, a simple circuit having a lower cost can be used in the implementation.

Figure 4:
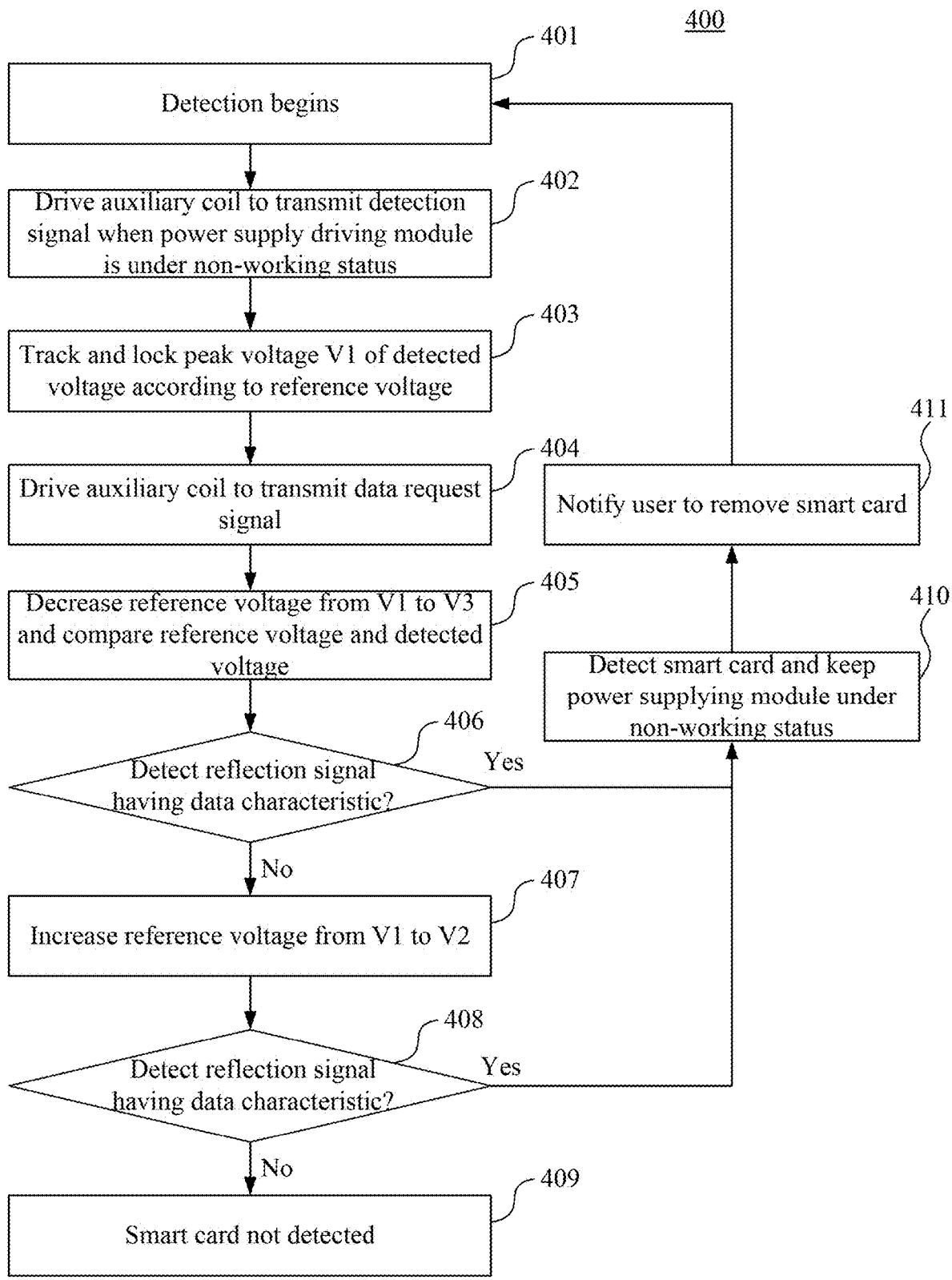
FIG. 4 is a flow chart of a NFC device identifying method in an embodiment of the present invention.

Reference is now made to FIG. 4. FIG. 4 is a flow chart of a NFC device identifying method 400 in an embodiment of the present invention. The NFC device identifying method 400 can be used in the power supply device 100 of the induction type power supply system 1 illustrated in FIG. 1 (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 401, the detection begins.

In step 402, the auxiliary driving module 108 drives the auxiliary coil 104 to transmit the detection signal DS having a frequency higher than that of the power signal PS during the first time interval when the power supply driving module 106 is under the non-working status.

In step 403, the signal detection module 110 tracks and locks the peak voltage V1 of the detected voltage Vd related to the auxiliary coil 104 according to the reference voltage Vref.

In step 404, the auxiliary driving module 108 drives the auxiliary coil 104 to transmit the data request signal DR during the second time interval.

In step 405, the digital to analog converter 120 decreases the reference voltage Vref from V1 to V3 and the signal detection module 110 compares the reference voltage Vref and the detected voltage Vd during the third time interval.

In step 406, the processing module 112 determines whether the reflection signal RS having the data characteristic is detected.

When the signal has a downward stretching part, a non-triggered section is present (i.e. the comparison result of the comparator 122 includes a part showing that the detected voltage is smaller than the fine-tuned reference voltage Vref) that is determined to be the data characteristic. If no non-triggered section is presented (i.e. the comparison result of the comparator 122 does not include the part showing that the detected voltage is smaller than the fine-tuned reference voltage Vref), the data characteristic is not presented either.

When the reflection signal RS having the data characteristic is not detected, in step 407, the digital to analog converter 120 increases the reference voltage Vref from V1 to V2 and the signal detection module 110 compares the reference voltage Vref and the detected voltage Vd during the third time interval.

In step 408, the processing module 112 determines whether the reflection signal RS having the data characteristic is detected.

When the signal has an upward stretching part, a triggered section is present (i.e. the comparison result of the comparator 122 includes a part showing that the detected voltage is larger than the fine-tuned reference voltage Vref) that is determined to be the data characteristic. If no triggered section is presented (i.e. the comparison result of the comparator 122 does not include the part showing that the detected voltage is larger than the fine-tuned reference voltage Vref), the data characteristic is not presented either.

When the processing module 112 determines that the reflection signal RS having the data characteristic is not detected, in step 409, the processing module 112 determines that the smart card 160 is not detected. Under such a condition, the processing module 112 keeps the power supply driving module 106 under the working status to drive the power supply coil 102 to generate the power signal PS to supply power to the power receiving device 150.

When the processing module 112 determines that the reflection signal RS is detected in step 406 or in step 408, in step 410, the processing module 112 further determines that the smart card 160 is detected and keeps the power supply driving module 106 under the non-working status. In step 411, the processing module 112 controls the alert module 170 to notify the user to remove the smart card 160.

In an embodiment, after step 411, the flow can go back to step 401 to perform detection again. A polling method is thus used to accomplish a continuous detection.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A power supply device used in an induction type power supply system, wherein the power supply device comprises:
   a power supply coil;
   an auxiliary coil;
   a power supply driving module electrically coupled to the power supply coil and configured to drive the power supply coil to transmit a power signal;
   an auxiliary driving module electrically coupled to the auxiliary coil and configured to drive the auxiliary coil to transmit a detection signal during a first time interval and drive the auxiliary coil to transmit a data request signal during a second time interval after the first time interval when the power supply driving module is under a non-working status;
   a signal detection module electrically coupled to the auxiliary coil and configured to detect a reflection signal corresponding to the data request signal on the auxiliary coil during a third time interval after the second time interval that the data request signal is transmitted; and
   a processing module configured to determine whether the signal detection module detects the reflection signal having a data characteristic and further keep the power supply driving module under the non-working status when the reflection signal having the data characteristic is determined to be detected by the signal detection module.

2. The power supply device of claim 1, wherein the processing module determines that a smart card exists within a power supplying range of the power supply coil when the reflection signal having the data characteristic is determined to be detected by the signal detection module.

3. The power supply device of claim 1, wherein the processing module does not decode the reflection signal.

4. The power supply device of claim 1, wherein the signal detection module comprises:
   a digital to analog converter configured to generate a reference voltage; and
   a comparator electrically coupled to the digital to analog converter and the auxiliary coil and configured to receive the reference voltage and a detected voltage related to the auxiliary coil to detect the reflection signal.

5. The power supply device of claim 4, wherein the comparator is configured to control the digital to analog converter to use the reference voltage to track and lock a peak voltage by using a feedback mechanism according to a first comparison result of the detected voltage and the reference voltage during the first time interval, and the digital to analog converter fine-tunes the reference voltage during the third time interval by using a pitch value such that the comparator detects the reflection signal according to a second comparison result of the detected voltage and the fine-tuned reference voltage.

6. The power supply device of claim 5, wherein the digital to analog converter increases the reference voltage with the pitch value during the third time interval such that the reflection signal is determined to have the data characteristic when the second comparison result comprises a part showing that the detected voltage is larger than the fine-tuned reference voltage and the reflection signal is determined to not have the data characteristic when the second comparison result does not comprise the part showing that the detected voltage is larger than the fine-tuned reference voltage.

7. The power supply device of claim 5, wherein the digital to analog converter decreases the reference voltage with the pitch value during the third time interval such that the reflection signal is determined to have the data characteristic when the second comparison result comprises a part showing that the detected voltage is smaller than the fine-tuned reference voltage and the reflection signal is determined to not have the data characteristic when the second comparison result does not comprise the part showing that the detected voltage is smaller than the fine-tuned reference voltage.

8. The power supply device of claim 4, further comprising a voltage-dividing module electrically coupled between the auxiliary coil and the comparator, and the detected voltage received by the comparator is a divided voltage of a voltage on the auxiliary coil.

9. The power supply device of claim 1, wherein the auxiliary driving module stops and starts to drive the auxiliary coil in an interlaced manner for several times to generate the data request signal.

10. The power supply device of claim 1, wherein the processing module keeps the power supply driving module under a working status to drive the power supply coil to transmit the power signal when the reflection signal not having the data characteristic is determined to be detected by the signal detection module.

11. A near field communication (NFC) device identifying method used in a power supply device in an induction type power supply system, wherein the NFC device identifying method comprises:
   driving an auxiliary coil to transmit a detection signal during a first time interval and driving the auxiliary coil to transmit a data request signal during a second time interval after the second time interval when a power supply driving module is under a non-working status by an auxiliary driving module electrically coupled to the auxiliary coil;
   detecting a reflection signal corresponding to the data request signal on the auxiliary coil during a third time interval after the second time interval that the data request signal is transmitted by a signal detection module;
   determining whether the signal detection module detects the reflection signal having a data characteristic by a processing module; and
   keeping the power supply driving module under the non-working status by the processing module when the reflection signal having the data characteristic is determined to be detected by the signal detection module.

12. The NFC device identifying method of claim 11, further comprising:
   determining that a smart card exists within a power supplying range of the power supply coil by the processing module when the reflection signal having the data characteristic is determined to be detected by the signal detection module.

13. The NFC device identifying method of claim 11, further comprising:
   not decoding the reflection signal by the processing module.

14. The NFC device identifying method of claim 11, further comprising:
   generating a reference voltage by a digital to analog converter of the signal detection module; and
   receiving the reference voltage and a detected voltage related to the auxiliary coil to detect the reflection signal by a comparator of the signal detection module.

15. The NFC device identifying method of claim 14, further comprising:
   controlling the digital to analog converter to use the reference voltage to track and lock a peak voltage by using a feedback mechanism according to a first comparison result of the detected voltage and the reference voltage during the first time interval by the comparator; and
   fine-tuning the reference voltage during the third time interval by using a pitch value by the digital to analog converter such that the comparator detects the reflection signal according to a second comparison result of the detected voltage and the fine-tuned reference voltage.

16. The NFC device identifying method of claim 15, wherein the digital to analog converter increases the reference voltage with the pitch value during the third time interval such that the reflection signal is determined to have the data characteristic when the second comparison result comprises a part showing that the detected voltage is larger than the fine-tuned reference voltage and the reflection signal is determined to not have the data characteristic when the second comparison result does not comprise the part showing that the detected voltage is larger than the fine-tuned reference voltage.

17. The NFC device identifying method of claim 15, wherein the digital to analog converter decreases the reference voltage with the pitch value during the third time interval such that the reflection signal is determined to have the data characteristic when the second comparison result comprises a part showing that the detected voltage is smaller than the fine-tuned reference voltage and the reflection signal is determined to not have the data characteristic when the second comparison result does not comprise the part showing that the detected voltage is smaller than the fine-tuned reference voltage.

18. The NFC device identifying method of claim 14, further comprising:
   receiving a divided voltage of a voltage on the auxiliary coil as the detected voltage by the comparator.

19. The NFC device identifying method of claim 11, further comprising:
   stopping and starting to drive the auxiliary coil in an interlaced manner for several times to generate the data request signal by the auxiliary driving module.

20. The NFC device identifying method of claim 11, further comprising:
   keeping the power supply driving module under a working status to drive the power supply coil to transmit the power signal by the processing module when the reflection signal not having the data characteristic is determined to be detected by the signal detection module.

* * * * *